US010942732B1

(12) United States Patent
Chandrasekhar et al.

(10) Patent No.: US 10,942,732 B1
(45) Date of Patent: Mar. 9, 2021

(54) INTEGRATION TEST FRAMEWORK

(71) Applicant: SAP SE, Walldorf (DE)

(72) Inventors: Anupama Chandrasekhar, Bangalore (IN); Akshay Kumar, Muzaffarnagar (IN); Ranjani Guruprasad, Bangalore (IN); Dirk Recktenwald, Speyer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/598,161

(22) Filed: Oct. 10, 2019

(51) Int. Cl.
*G06F 8/71* (2018.01)
*G06F 9/54* (2006.01)
*G06F 11/36* (2006.01)

(52) U.S. Cl.
CPC .......... *G06F 8/71* (2013.01); *G06F 9/54* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| 8,683,554 | B2* | 3/2014 | Martin | G06F 9/541 |
| | | | | 726/4 |
| 2005/0193397 | A1* | 9/2005 | Corenthin | G11B 20/1833 |
| | | | | 719/328 |
| 2012/0047494 | A1* | 2/2012 | Unrein | G06F 9/44521 |
| | | | | 717/137 |
| 2014/0281708 | A1* | 9/2014 | Adam | G06F 11/1479 |
| | | | | 714/18 |
| 2016/0011732 | A1* | 1/2016 | Yang | G06F 21/50 |
| | | | | 715/763 |
| 2017/0123863 | A1* | 5/2017 | Erickson | G06F 9/54 |
| 2019/0163469 | A1* | 5/2019 | Sreenivasa | G06F 8/658 |
| 2019/0286451 | A1* | 9/2019 | Awadallah | G06F 8/30 |
| 2020/0065789 | A1* | 2/2020 | McCarthy | G06Q 20/20 |
| 2020/0210525 | A1* | 7/2020 | Yang | G06F 16/3344 |
| 2020/0301940 | A1* | 9/2020 | Hollander | G06F 16/24556 |

OTHER PUBLICATIONS

Myers, "Improving API usability", 2016, ACM Digital Library (Year: 2016).*

* cited by examiner

*Primary Examiner* — Hossain M Morshed
(74) *Attorney, Agent, or Firm* — Buckley, Maschoff & Talwalkar LLC

(57) ABSTRACT

According to some embodiments, systems and methods are provided, comprising a first platform including an Application Programming Interface (API) provider; at least one data source; an integration framework module operative to execute: an integration process to integrate a third-party application with the first platform, and a test process wherein one of a plurality of whitelisted APIs provided by the API provider is executed to analyze the integration; a user interface; a memory storing program instructions; and an integration framework processor, coupled to the memory, and in communication with the integration framework module and operative to execute program instructions to: receive input data associated with the at least one data source via the user interface; transform the input data to an XML format for the integration process; access an API of the plurality of APIs; one of enter XML, format data into the API and retrieve data from the API; transform the retrieved data into a non-technical format; and render the transformed data in a dynamic user interface. Numerous other aspects are provided.

20 Claims, 18 Drawing Sheets

| SalesOrder | | | | |
|---|---|---|---|---|
| SalesOrder | SoldToParty | PurchaseOrderByCustomer | SalesOrderDate | TotalNetAmount |
| 2247 | 10100999 | 4500023939 | 23/11/2018 | 100.00 |
| 2246 | 10100999 | 4500023937 | 09/11/2018 | 50.00 |
| 2145 | 10100999 | 4500023915 | 01/06/2018 | 10.00 |
| 2144 | 10100999 | 4500023910 | 25/05/2018 | 50.00 |
| 2044 | 10100999 | 4500023869 | 09/05/2018 | 300.00 |
| 1948 | 17100001 | 233 | 21/05/2018 | 888000.00 |
| 1947 | 10100999 | xx | 17/05/2018 | 52.65 |
| 1946 | 10100999 | 4500023906 | 08/05/2018 | 200.00 |
| 1945 | 10100999 | 4500023893 | 09/05/2018 | 300.00 |
| 1847 | 10100999 | 4500023910 | 06/06/2018 | 100.00 |
| 1846 | 17100001 | check of custom field | 01/06/2018 | 175.50 |
| 1845 | 10100999 | 4500023894 | 08/05/2018 | 200.00 |
| 1844 | 10100999 | 4500023889 | 03/05/2018 | 300.00 |
| 1746 | 10100999 | 4500023912 | 30/05/2018 | 100.00 |
| 1745 | 10100999 | 4500023880 | 03/05/2018 | 10.00 |

*FIG. 14B*

INTEGRATION TEST FRAMEWORK

BACKGROUND

To help prevent unauthorized access to an organization's computer network, only IP addresses in an Application Programming Interface (API) whitelist can make API calls to the organization's network. Generally speaking, a "whitelist" is an index of approved entities, and "whitelisting" is the practice of explicitly allowing some identified entities access to a particular privilege, service, mobility, access or recognition. Any entity not on the whitelist is blocked from access.

A third-party user may want to access the organization's computer network to avail themselves of the services/products and data stored on the organization's computer network. The data provided by the third-party user may need to be read, formatted and processed before being allowed to access the organization's computer network via an appropriate whitelisted API. These read, write, update, format, process operations may be difficult to execute as they are manual processes, and no user-friendly interface exists to facilitate these processes.

Additionally, a third-party user may build an application to access the organization's computer network using one or more whitelisted APIs provided by an API provider. Prior to using the whitelisted API in their application, the user may want to test the whitelisted API to determine the input and input parameters, as well as the output. The user may want to see the format of the input/output to understand how the data is received and provided in order to facilitate their development of their application. However, users may find it difficult to test whitelisted APIs from an API provider, as no user-friendly interface is provided.

The existing methodology for an API consumption revolves around an elementary form of data exchange, where the user is expected to interpret the underlying data structures, data types and the data format for input and output. Often, the exchange of data between the user and the API results in exchange failure due to the inability of the user to understand the data.

Systems and methods are desired which support efficient integration of a third-party user with an organization's computer network.

BRIEF DESCRIPTION OF THE DRAWINGS

FIG. 6 is an example of a user interface according to some embodiments.

FIG. 11 is an example of a user interface according to some embodiments.

FIG. 14B is an example of a user interface according to some embodiments.

DETAILED DESCRIPTION

Figure 1:
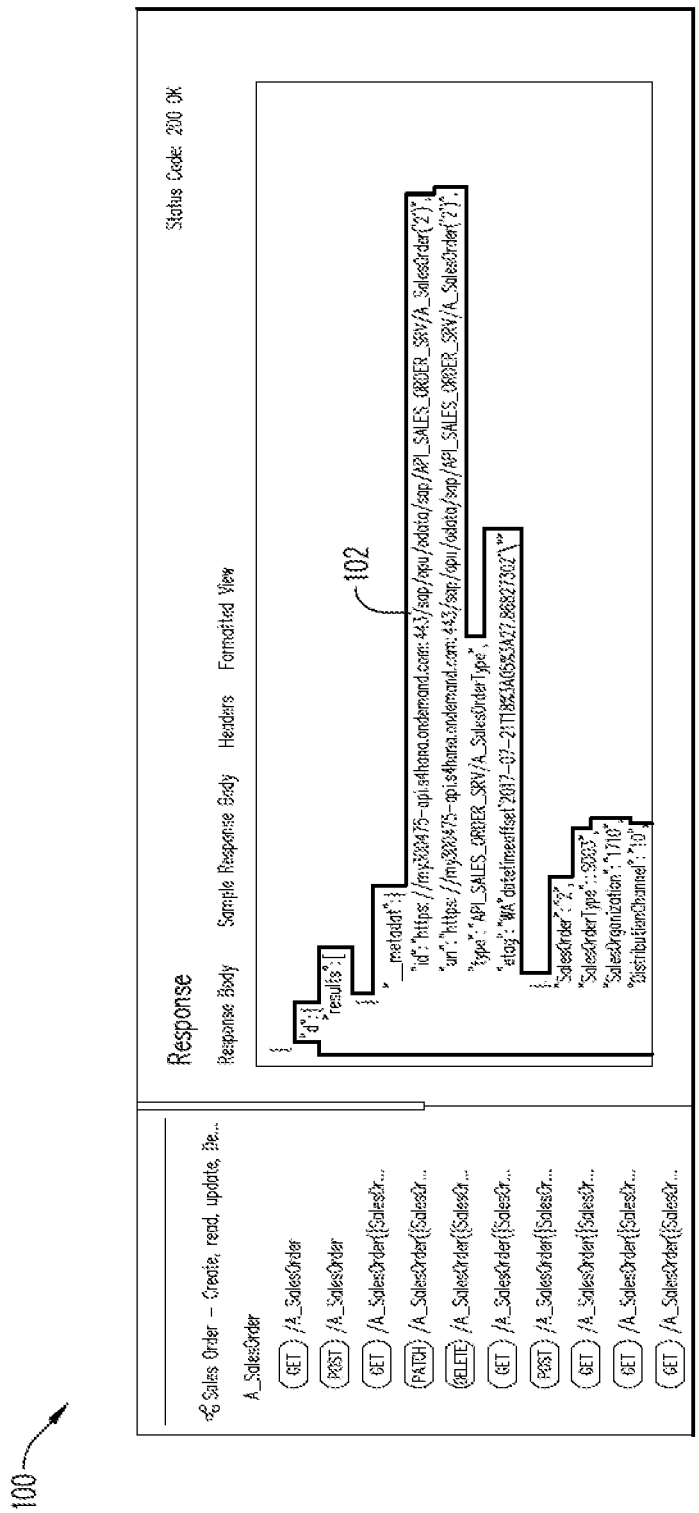
FIG. 1 is a prior art user interface.
Figure 2:
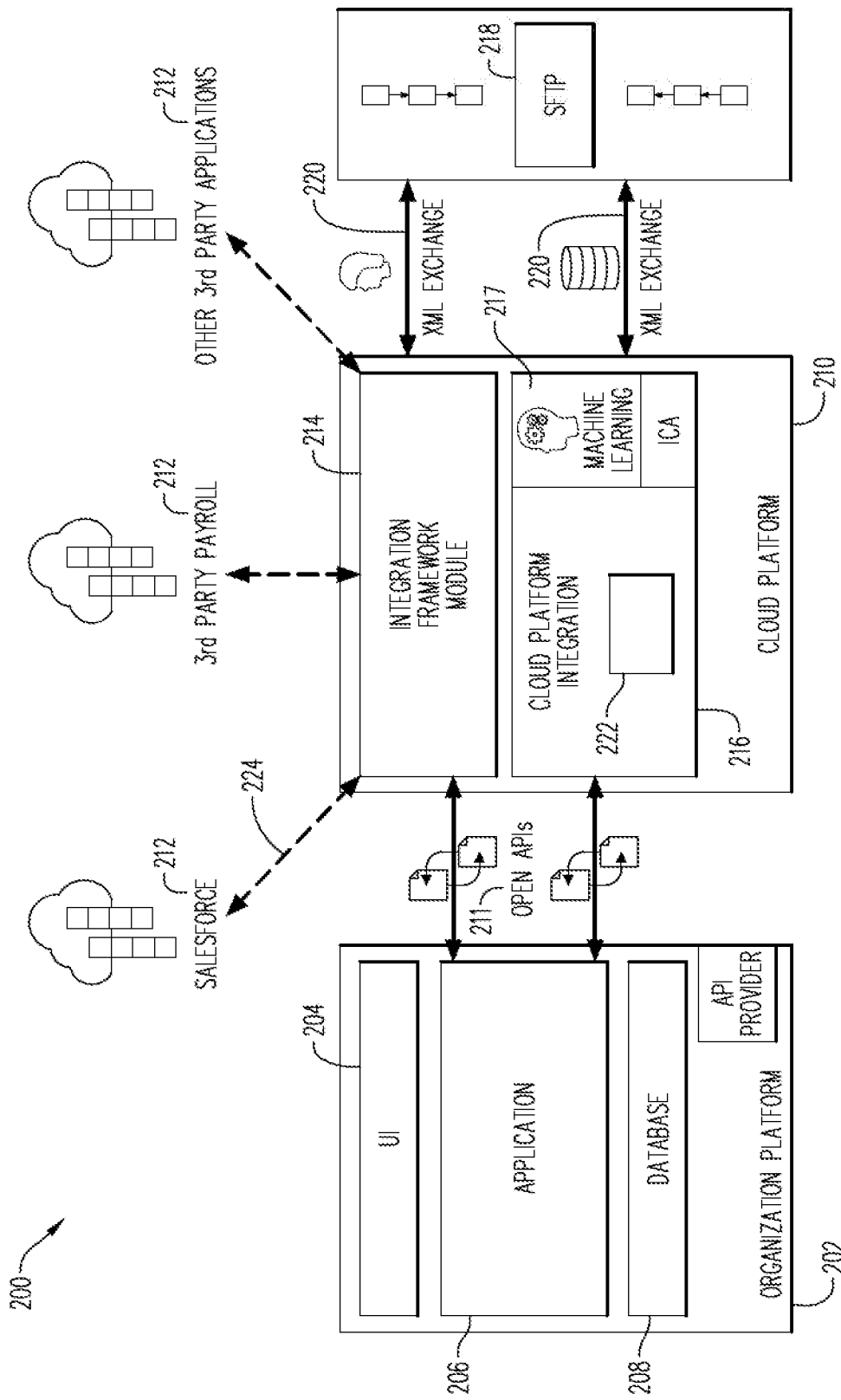
FIG. 2 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

For security reasons, third-party users/applications may not be given direct access to an organization's computer network. Instead these third-party users may use a whitelisted API to access the organization's computer network. As described above, only IP addresses in an Application Programming Interface (API) whitelist can make API calls to the organization's network. Generally speaking, a "whitelist" is an index of approved entities, and "whitelisting" is the practice of explicitly allowing some identified entities access to a particular privilege, service, mobility, access or recognition. Whatever is not on the whitelist is blocked from access.

The whitelisted API may receive data from the third-party user in a particular format for processing in order to access the organization's computer network. The data (e.g., documents) received from the third-party user may be read, formatted and further processed before being received by the whitelisted API. The processes to read, format, etc. may not be user friendly as they are manual processes in a language (e.g., JSON) not readily understandable by a non-technical user. Further, the third-party user may want to test the whitelisted API before using it to access the organization's computer network. The testing may include determining the input, input parameters and output, as well as determining the format of the input/output to understand how the data is received and provided.

The existing methodology for API consumption revolves around an elementary form of data exchange, where the user is expected to interpret the underlying data structures, data types and the data format for input and output. As shown in the user interface 100 in FIG. 1, the data is read in JSON format, so the user needs to understand this format to understand the data. Often, the attempted exchange of data between the user and the API provided by an API provider results in failure due to the inability of the user to understand the data.

One or more embodiments provide an integration framework module to: 1. Create, read, update and delete data in the platform so as to be integrated with a third-party application; and 2. Test any whitelisted APIs.

One or more embodiments provide for reading a specific record of a business object, as well as a dynamic visualization for creating/updating/viewing/testing data, and any other suitable data-related process. The UI may read the DML and list the information for display in the UI. The integration framework module, in one or more embodiments, may be a new technical layer on top of an API, and may interpret the input data and output data, and the complex formats, to provide the data to the user in a consumable manner (i.e., non-technical format without technical text of JSON or XML), without the user needing to understand the technical aspects of JSON or XML. The integration framework module supports non-technical users to consume APIs easily and productively. It is noted that one or more embodiments provide another layer on top of the XML (or other technical language) to make the UI understandable by the user, as typically XML is a technical text.

One or more embodiments provide for an integration framework module to set up an integration between the organization's computer network ("platform") and a third-party user using whitelisted APIs in a create process. The integration framework module may dynamically read data from a format sent by the third-party user and generate data for consumption by an API associated with the organization platform. The platform may then receive the information via the API and create the data on the platform. The integration framework module may facilitate building applications on a cloud platform by reading data from the organization's platform (e.g., generating payload/data formats; visualizing how the application would look using the whitelisted API; and testing the whitelisted API). The integration framework module may also identify test integration requirements.

In one or more embodiments, the integration framework module may read data in XML/JSON formats received from a third-party application and render a dynamic user interface (UI) for a user to easily visualize and manipulate data to test the integration, and then save the manipulated data, without requiring knowledge of XML or JSON formats. It is noted that while XML may be the frequently data format for third party applications, any suitable format may be used. The UI may be dynamically rendered by the integration framework module intelligently identifying the Business Objects and the number of fields in the XML/JSON format, as described further below. Conversely, in one or more embodiments, the integration framework module may simulate the third-party application and create XML to read master data and transaction data from the organization's platform and synchronize with the third-party application to create documents for the application in the organization's platform.

As a non-exhaustive example, a Sales Force application (third-party application) is used to obtain customer details and sales orders, whereas fulfillment of the sales orders occurs via the organization's platform. While this non-exhaustive example may be referred to throughout the specification, any third-party application may be used.

In one or more embodiments, the integration framework module may read the data format of a whitelisted API and dynamically render a UI which may be used by a third-party user to read data from all systems across the organization's platform that publish APIs at an API provider. This read data may then be processed and updated back into the respective system. The integration framework module may, in one or more embodiments, support all Create, Read, Update, Delete (CRUD) operations that a given whitelisted API supports.

It is noted that, in one or more embodiments, the integration framework module may be integrated with an API provider or deployed on a cloud platform, and may also be included in a tool available on the organization's platform. The integration framework module may be used for testing and setting up integrations within the organization's landscape and with third-party applications.

Regarding testing, as described above, testing the APIs using existing tools may be very difficult due to lack of a user interface, and specific JSON/ODATA/REST/WL/SOAP knowledge to test the API. Embodiments provide the integration framework module to render a dynamic user interface based on a selected API for ODATA, REST and SOAP. Embodiments may provide sample data to the user in the expected formats for all fields of the API for a "create" test operation. Embodiments may provide for the user to view existing data of a record and "edit" the data as needed during testing.

FIGS. 2-15 include a system 200 and flow diagrams of processes 400 (FIG. 4), 800 (FIG. 8) and 1300 (FIG. 13) for executing an integration framework module according to some embodiments. Processes 400, 800 and 1300 may be executed by application server 1630 according to some embodiments. In one or more embodiments, the application server 1630 may be conditioned to perform the processes 400, 800, 1300, such that a processor 1610 (FIG. 16) of the server 1630 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In one or more embodiments, the system 200 may include an organization computer network platform 202 ("organization platform"). As a non-exhaustive example, the platform may be any cloud-based or otherwise enterprise resource planning platform, such as SAP S/4HANA Cloud®. The platform 202 may include: one or more user interfaces 204 that may be accessed by one or more users (not shown) of the platform 202; one or more applications 206 that may be executed on the platform 202; and one or more databases 208. Although not shown, the platform 202 may include any suitable processors, servers and processor-executable program code.

The system 200 may also include a cloud platform 210 (or other suitable platform) that may be accessed by the organization platform 202 via one or more APIs 211. As used herein, the terms "Open API" and "Whitelisted API" may be used interchangeably. In some examples, the embodiments herein may be incorporated within software that is deployed on a cloud platform. The cloud platform 210 may include multiple tenants 212. In an embodiment, a tenant may represent an application or system in a distributed computing environment (e.g., cloud computing environment). In some embodiments, multiple tenants may be deployed in the cloud computing environment, onto which the user may log on and execute specific functionalities or operations. The cloud platform 210 may include the internet, in that any servers on the cloud platform 210 may be located remote from clients/third-party users. In some embodiments, multiple third-party tenants 212 may access the cloud platform 210 via the internet or other suitable communication channel.

In one or more embodiments the cloud platform 210 may include the integration framework module 214. The cloud platform 210 may also include a cloud platform integration (CPI) module 216. The CPI module 216 may allow the synchronization of data between another system component (e.g., SFTP server 218) and the organization platform 202. In one or more embodiments, the CPI module 216 may enable bi-directional process integration in real time between the system component and the organization platform. The CPI module 216 may include a machine learning process 217 whereby the machine learning process may include an Integration Content Advisor (ICA) to execute the source-target mapping. As a non-exhaustive example, the source may have "first name" and "last name" in different fields, but the target understands them in a single filed called "name format". As such, the ICA may combine the two fields into one filed in the target based on existing training. It is noted that the mapping process may be via ICA, other machine learning processes, or event executed without machine learning (e.g., manually).

The system 200 may, in one or more embodiments, include a Secure File Transfer Protocol (SFTP) server 218. The SFTP server 218 may be communicatively coupled to the cloud platform 210, and in particular to the integration framework module 214 and the CPI module 216. In one or more embodiments, the communicative coupling may be via an XML, exchange 220 or any other suitable channel.

Prior to the start of the process 400, a map 222 is created to link every field of the third-party application to a particular location in a given API. In one or more embodiments, in the map 222, the fields from the third-party application may be in XML format. In one or more embodiments, the map 222 may be generated by any suitable process (e.g., an i-flow process). As used herein, the terms "API" and "whitelisted API" may be used interchangeably.

Figure 4:
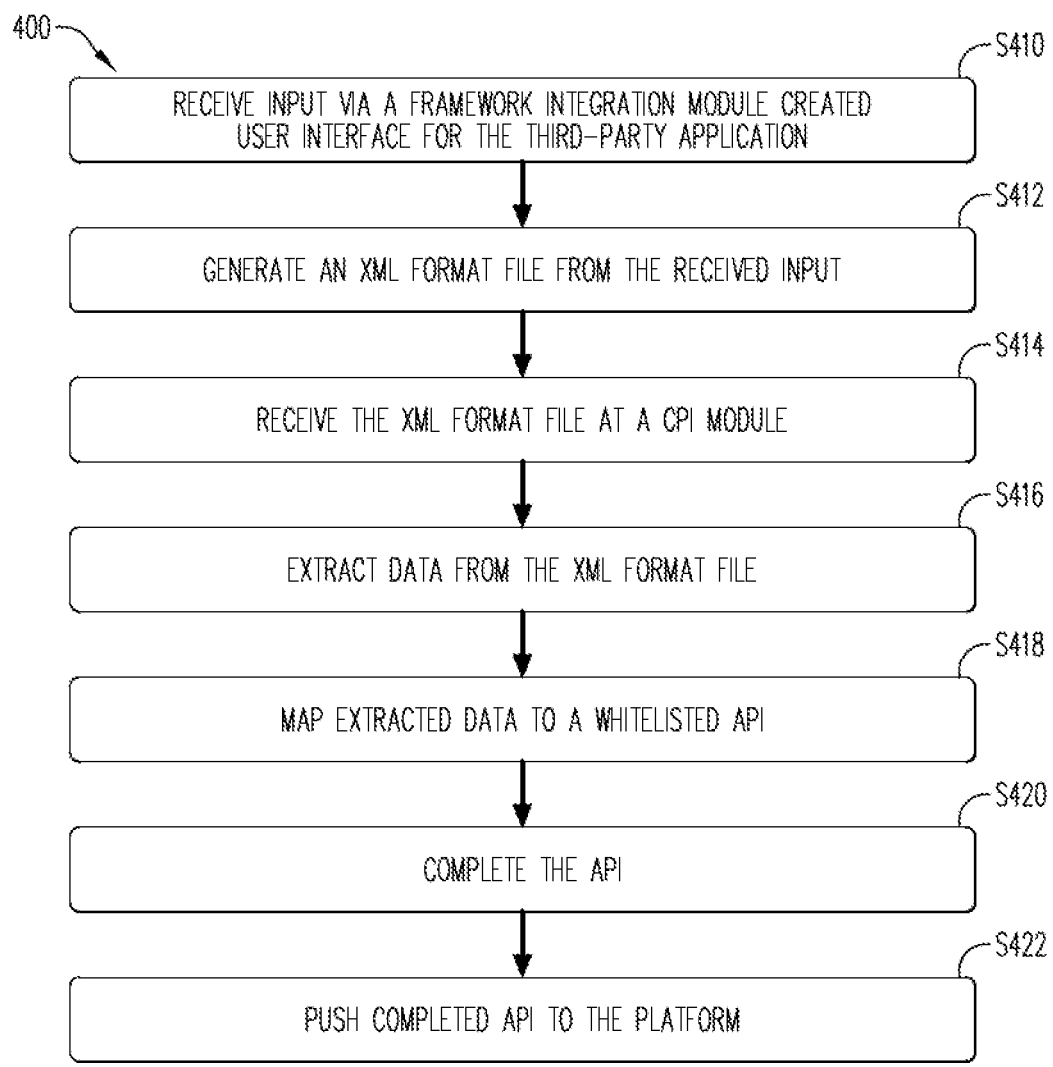
FIG. 4 is a flow diagram of a process according to some embodiments.

Turning to FIG. 4, the process 400 to integrate data from the third-party tenants 212 with the organization platform 202 is provided.

Initially, at S410, input 224 is received via an integration framework module-created user interface for the third-party application 212. In one or more embodiments, the UI created by the integration framework module 214 mimics the third-party application 212, as the integration framework module 214 has built an API to receive the information from the third-party application. In one or more embodiments, the UI is dynamically generated by the integration framework module 214, and then the data is filled in by the user. The input 224 may be the data entered by a user of the third-party application 212, where the third-party application is the data source. In one or more embodiments, the input 224 may be received in JSON format or any other suitable format.

Figure 5:
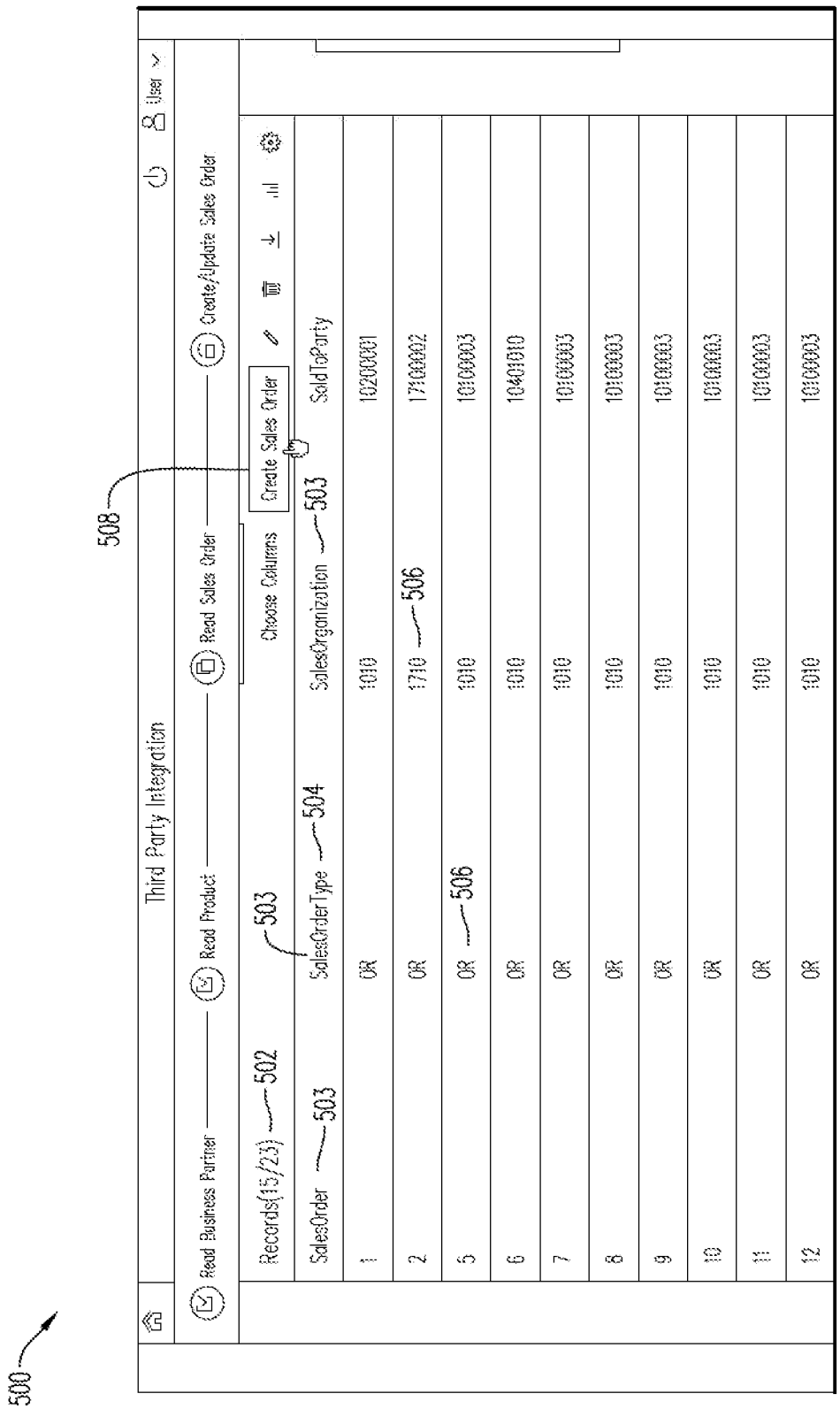
FIG. 5 is an example of a user interface according to some embodiments.
Figure 7:
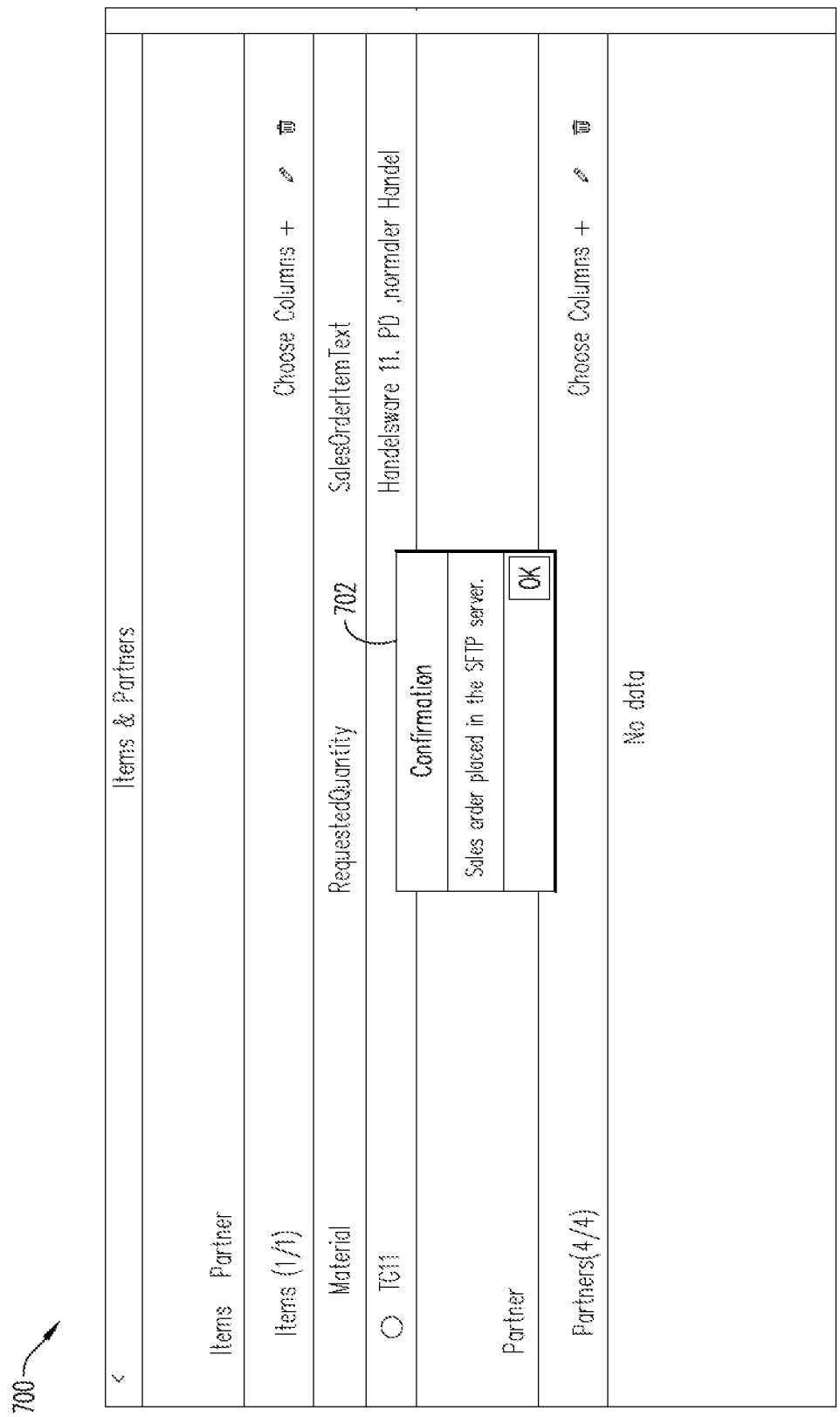
FIG. 7 is an example of a user interface according to some embodiments.

Continuing with the non-exhaustive example described above, the user of the third-party application 212 may create a sales order. FIG. 5, shows an example of user interface 500 to create a sales order via the third-party application 212. The user interface 500 may include a record 502 from which the sales order may be created. Each record 501 may include one or more columns 503 of data. In the example shown herein, the user interface 500 displays a record 502 including sales orders for a particular sales order type 504. The record 502 may include one or more columns 503 storing data elements 506 (e.g., sales organization, soldtoparty, etc.) for the respective column. The user may create the sales order by selecting the "create sales order" button 508, or via any other selection element.

Figure 6:
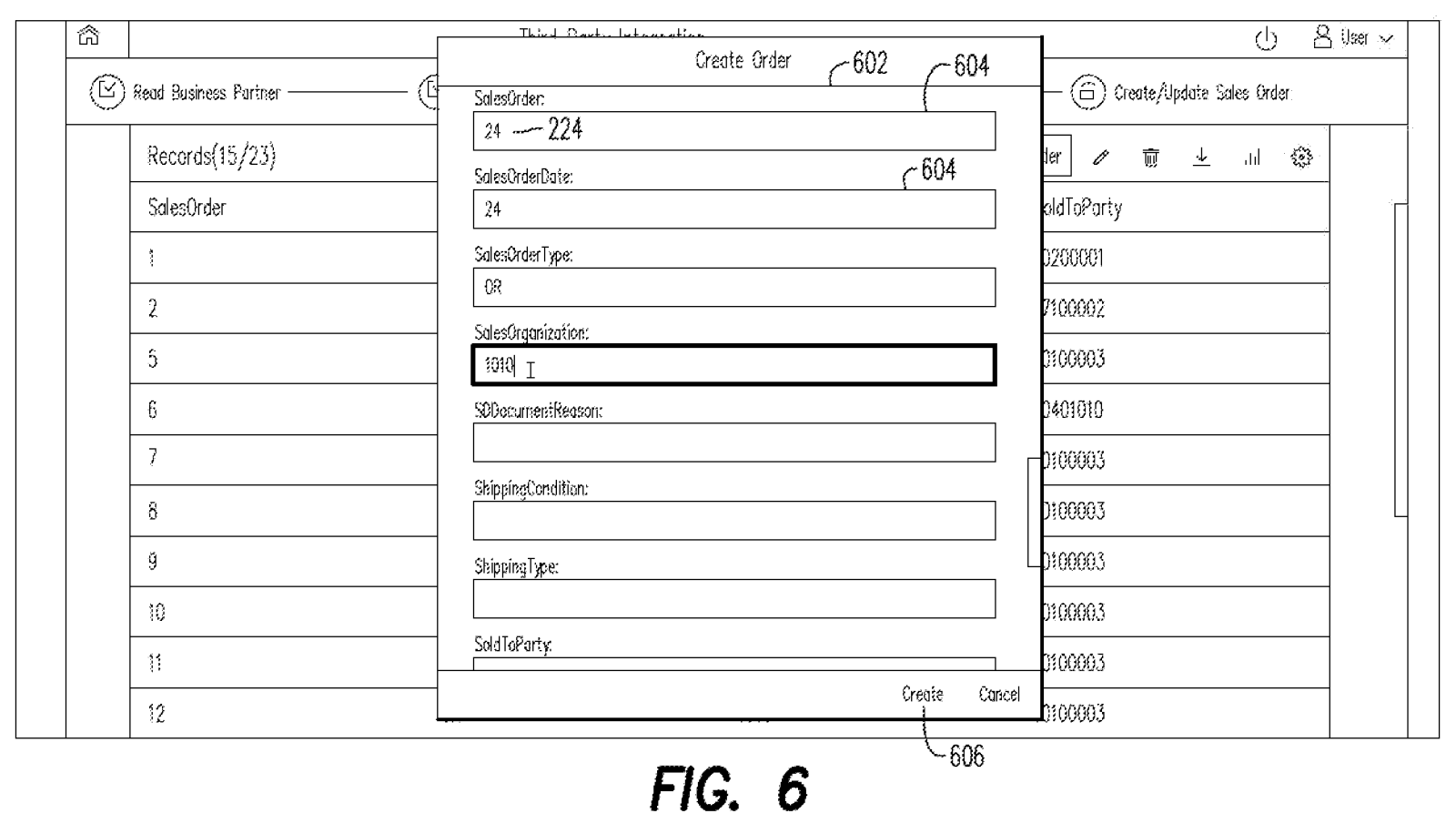

After selection of the "create sales order" button 508, in one or more embodiments, the user may be presented with a template 602 to enter the input 224 into one or more fields 604, as shown in FIG. 6. It is noted that each of the fields 604 in the template 602 may correspond to a column 503 in the record 502. Continuing with the example shown herein, the user has decided to create an order for sales order 24, and entered the input the user wants to integrate with the organization platform 202. It is noted that the user of the third-party application 212 may enter input into all of the fields 604 or less than all of the fields 604. It is noted that the UI the user enters data into is not the actual UI for the third-party application, rather, the UI is the simulated UI created by the integration framework module 214 for testing purposes. The determination of which fields to enter data in may be based on the business objects, which are selected via the application (e.g., mandatory fields are based on the selection of the business object. In one or more embodiments, only the mandatory fields need to have data entered therein. After the user enters data in the one or more fields 604, the user may select the "create" button 606. While a button is shown herein, any suitable selector may be used.

In one or more embodiments, selection of the "create" button 606 may transmit a JSON version of the template 602 to the integration framework module 214. The integration framework module 214 then converts the received input into an XML, format file in S412. It is noted that the integration framework module 214 may convert the received input into any other suitable format.

Figure 3:
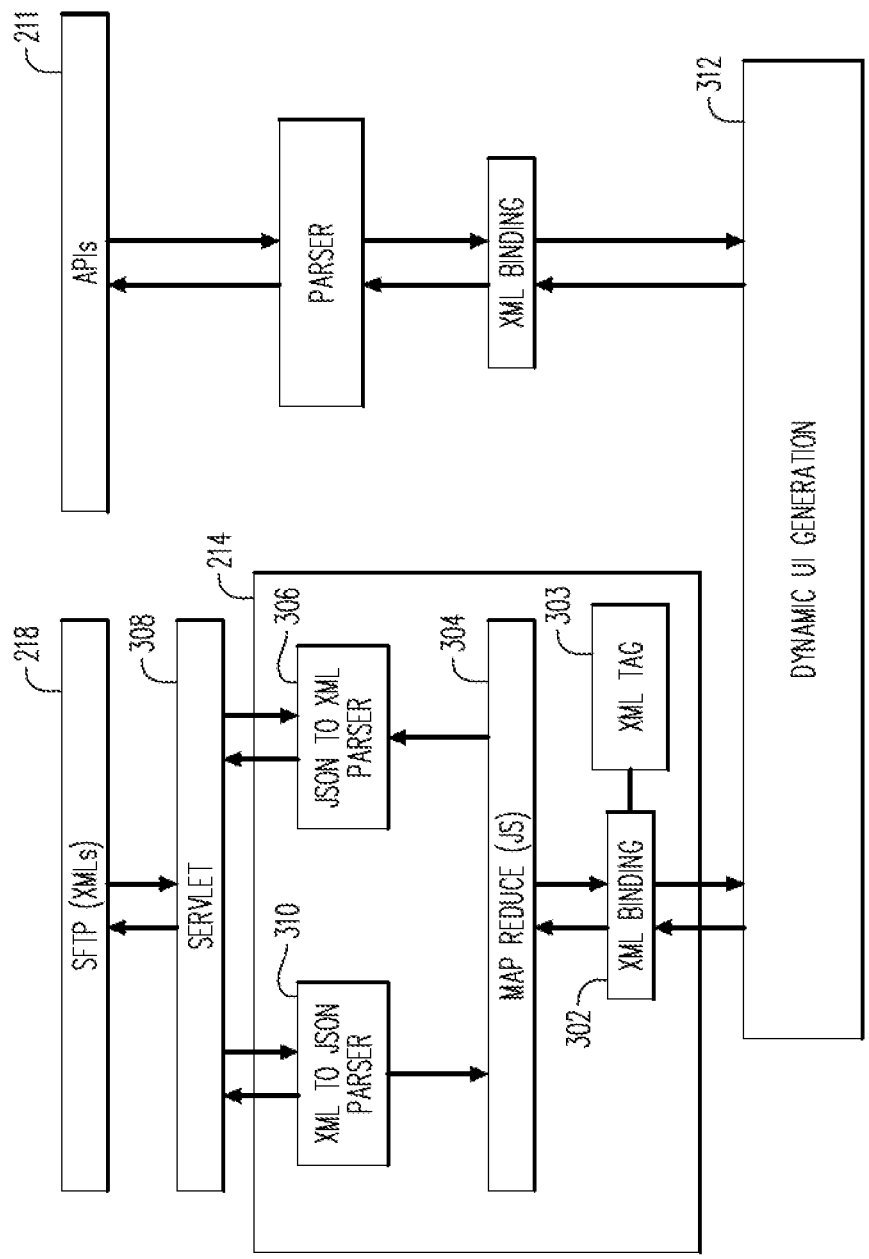
FIG. 3 is a block diagram of a system architecture according to some embodiments.

In one or more embodiments, as part of S412, the integration framework module 214 may include an XML binding process 302 (FIG. 3). The XML binding process 302 may associate each of the columns 503 of the record 503 with an XML tag 303. As used herein, the XML tag 303 may indicate the start and end of the information to be converted to XML. In one or more embodiments, each XML tag 303 may correspond to a column 503 of the record. In one or more embodiments, each column may include a sequence number associated therewith to indicate the order in which the columns were originally received. After the XML binding process 302, a MAP Reduce (JS) process 304 may be executed. The MAP Reduce (JS) process 304 may use the associations created by the XML binding process 302 and manipulate these associations to create a smaller set of associations. It is noted that the XML binding process 302 may be for the technical component (e.g., Views) of the UI application, and may be separate from the XML placed in the SFTP server. A non-exhaustive example of a MAP Reduce (JS) process 304 may be Apache MapReduce®. The output of the MAP Reduce (JS) process 304 may then be received by a JSON to XML Parser 306. In one or more embodiments, the JSON to XML Parser 306 may generate the XML format file. Next, the SFTP server 218, and in particular, a servlet layer 308 of the SFTP server 218 may receive the generated XML format file. In one or more embodiments, the servlet layer 308 may be a JAVA servlet layer, and may be used to interact with the CPI module 216 and the JSON to XML Parser 306 of the integration framework module 214, as well as the XML to JSON Parser 310 of the integration framework 214, described further below. In one or more embodiments, the integration framework module 214 may transmit the generated XML format file to the SFTP server 218 via the XML exchange 220, or any other suitable communication channel.

In one or more embodiments, after the SFTP server 218 has received the generated XML format file, the user may receive a confirmation message 702 (FIG. 7) via the user interface 700.

Turning back to the process 400, in S414, the CPI module 216 may receive the generated XML format file from the servlet layer 308 of the SFTP server 218 via another XML exchange 220 or any other suitable communication channel. The CPI module 216 may execute one of a pull process, whereby the CPI module 216 polls the SFTP server 218 to determine whether any new generated XML format files are available, and a push process, whereby the CPI module 216 receives notification of the existence of new generated XML format files. The polling may be executed in any suitable time interval.

The CPI module 216 may then read the XML format file and extract data therefrom in S416. In one or more embodiments, the extracted data may be the data values 224 included in the fields 604 (e.g., the information from the sales order). Next, in S418, the CPI module 216 may map the extracted data to the representative whitelisted API 211 per the map 222 created prior to execution of the process 400. In one or more embodiments, mapping the extracted data to the representative whitelisted API 211 may include the CPI module 216 recognizing, via a machine learning (ML) based mapping process 217, that the XML format file relates to a particular API. It is noted that the ML process 217 may be used to automate the XML reading, processing and formatting features.

Continuing with the non-exhaustive example, the CPI module 216 has been trained via the ML process 217 to recognize that the tags 303 in the XML format file correspond to a salesorder API 211 in the organization platform 202. The CPI module 216 may then call the particular API (e.g., salesorder API), and determine where in the API to input the tags 303 from the XML format file. It is noted that the operation to be performed on the whitelisted API 211 (e.g., read/write/update/delete operation) based on the calls and what the user wants is configured by the CPI module. Continuing with the example, a salesorder ID from the XML format file (e.g., number 34 in FIG. 6) may be a bit in the API 211 and the salesorder ID from the API may be a field. As another non-exhaustive example, a "CUSTOMER ID" filed in XML coming from a third-party application may be a "SOLD TO PARTY" field in the organization platform (API). As yet another non-exhaustive example, "Quantity" and "Unit" (e.g., 50 pieces) in an organization platform (API) may be mapped to a different quantity and unit (e.g., 1 Carton) in the third-party application. The whitelisted API 211 is then completed with the extracted and mapped data in S420. Next, the CPI module 216 may push the completed whitelisted API 211 to the organization platform 202 for further processing in S422. At this point, the received input 224 has been created as a record in the organization platform 202 based on the data mapped to the API. Continuing with the non-exhaustive example herein, the organization platform 202 may fulfill the order per the received completed whitelisted API 211.

Figure 8:
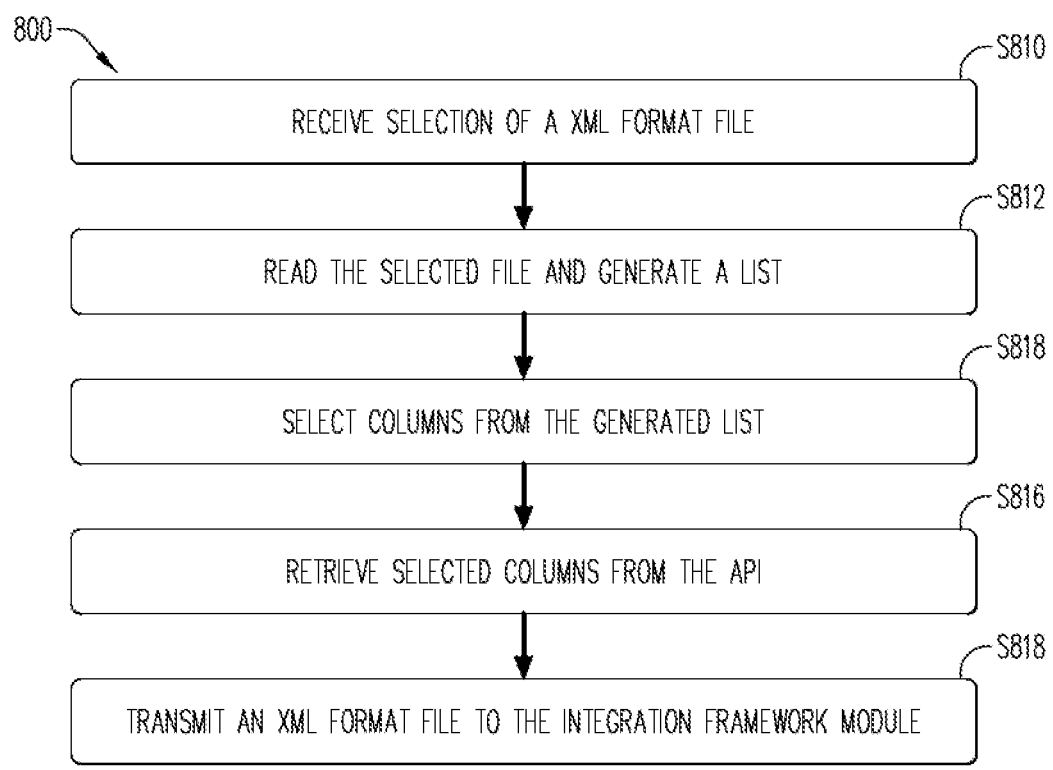
FIG. 8 is a flow diagram of a process according to some embodiments.
Figure 9:
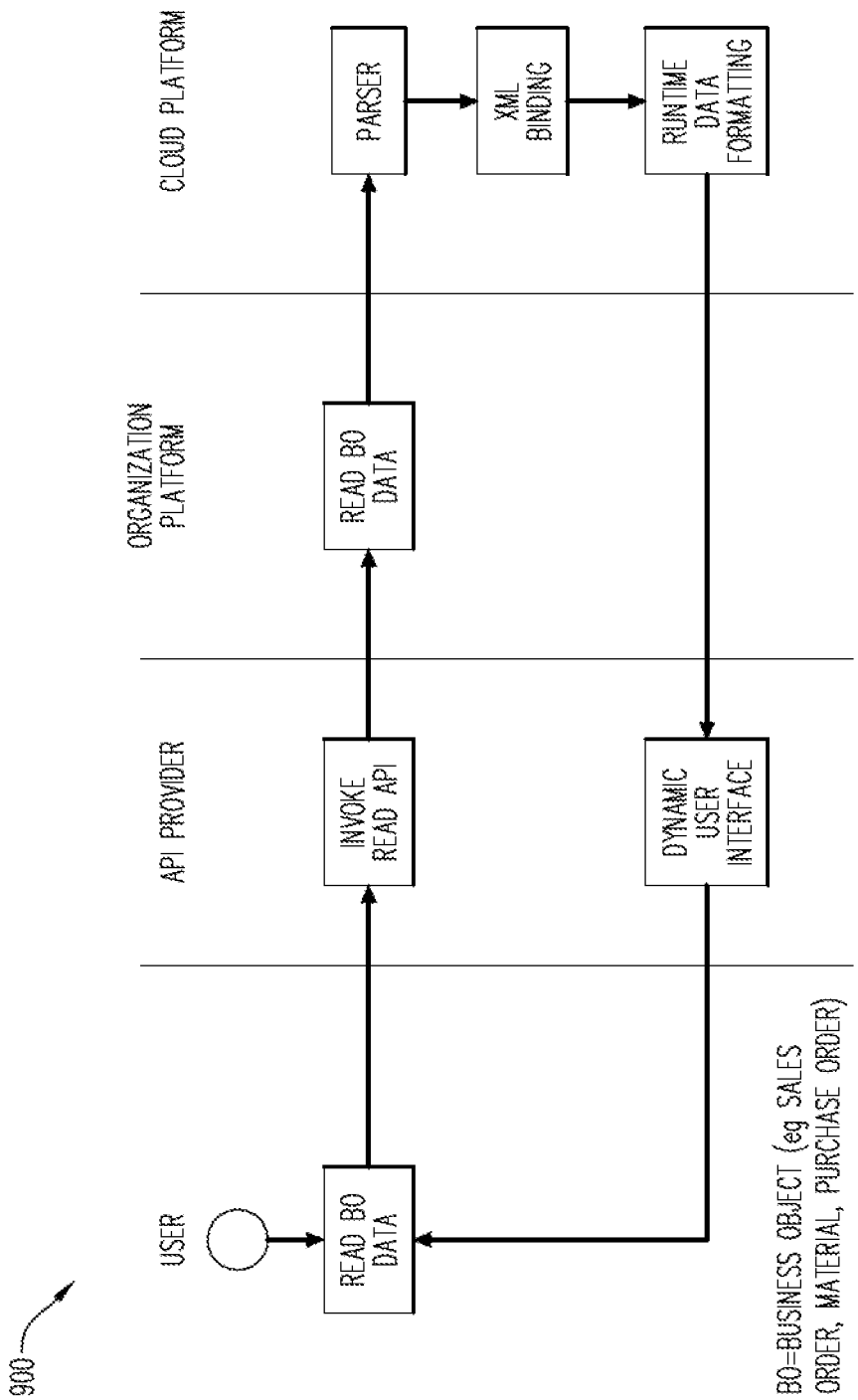
FIG. 9 is a block diagram of a process according to some embodiments.
Figure 10:
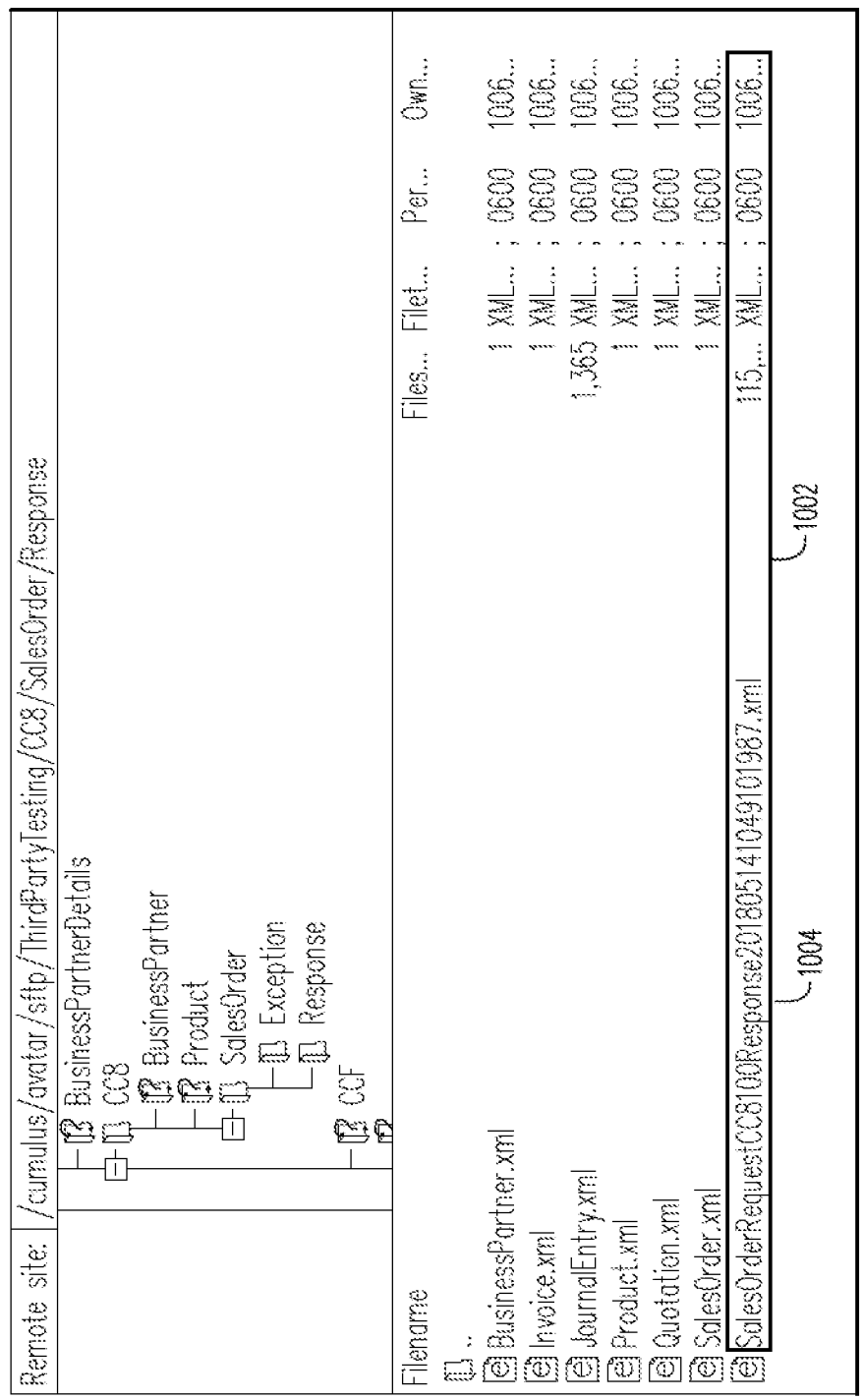
FIG. 10 is an example of a snapshot of available XML files in an SFTP server according to some embodiments.

Turning to FIGS. 8 and 9, a process 800 (FIG. 8)/900 (FIG. 9) to receive data (e.g., a read operation) from organization platform 202 by the third-party application 212 is described. The read operation may be executed at any time after the data has been created in the organization platform 202.

Figure 12:
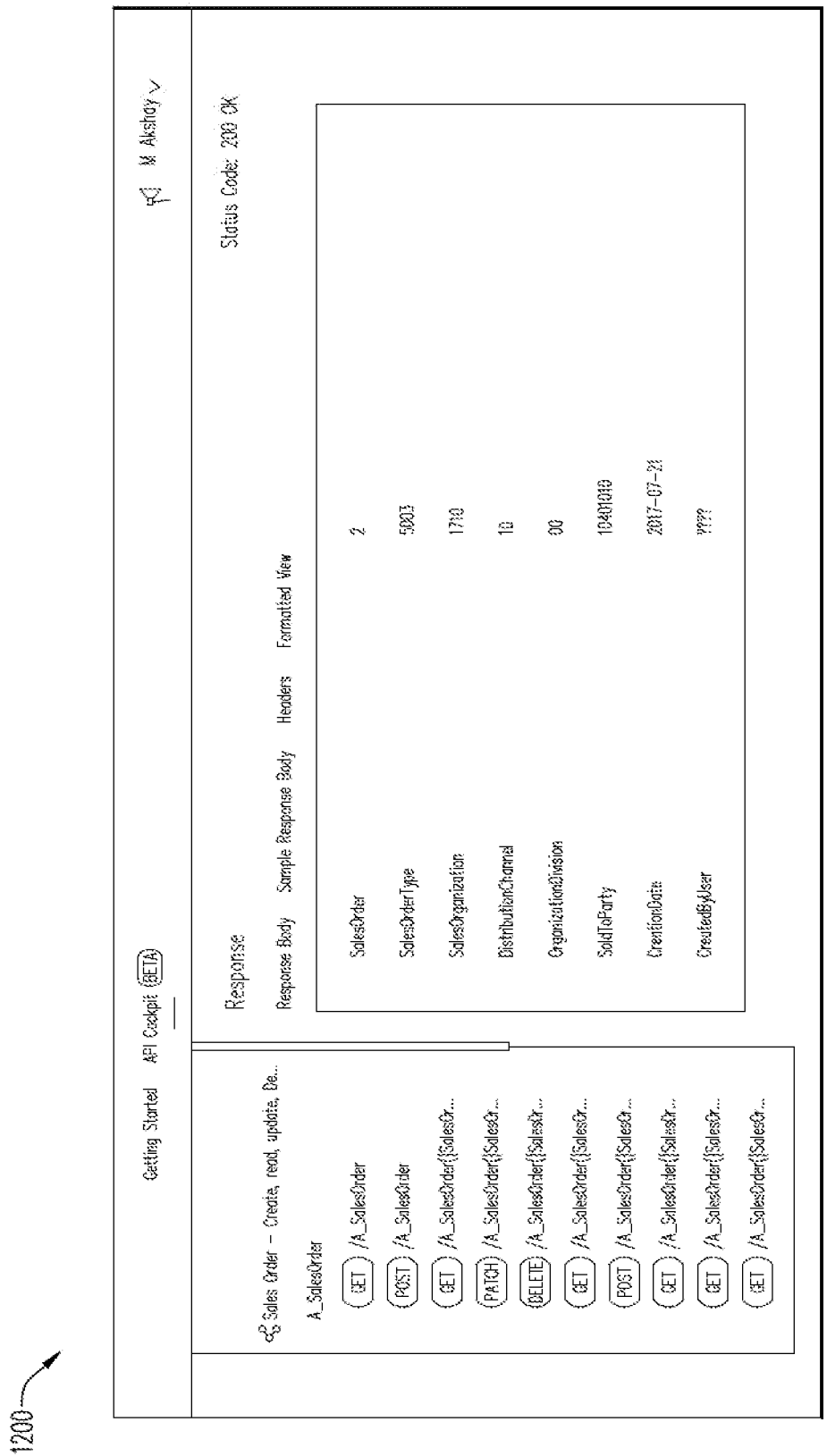
FIG. 12 is an example of a user interface according to some embodiments.

As shown in FIG. 9, a process may start when a user wants to perform, a read" operation and a "get data" operation from a data source. As described further below, the user may trigger the API from the API provider. The API provider may then request data from the data source. The fetched data may undergo transformation via the integration framework module to transform the fetched data into a non-technical format. For example, in one or more embodiments, the fetched data may be parsed, and XML binding may be executed to output the requested data in a suitable runtime format (e.g., consumable by a non-technical user). The transformed data may then be rendered in a dynamically built user interface, as shown in FIG. 12.

Initially, at S810 a read request is received from a third-party application 212 to read data stored in the organization platform 202. The read request may be received via the dynamically generated UI 312 of the integration framework module 214 via a request XML placed by the integration framework module 214 into the SFTP. In one or more embodiments, for testing, and not necessarily part of the deployment of the application, the user of the third-party application 212 may select 1002 (e.g., via highlighting) an XML format file 1004 (FIG. 10) stored on the SFTP server 218. Then, in S812, the integration framework module 214 reads the XML format file and dynamically generates a list 1102 (FIG. 11) of the possible columns to display in the UI for the user. The list 1102 of columns may be based on the data in the selected XML format file 1004. In one or more embodiments, each column in list 1102 may include a sequence number 1104 associated therewith. The sequence number 1104 may indicate the order in which the columns were originally received by the SFTP server 218 when the order was created, as described above with respect to FIG. 4. For example, the SalesOrganization column 503 has a sequence number 1104 of "27," meaning that the SalesOrganization column 503 was the 27th column in the input data received in S410. The user selects which columns they want to display in the dynamic UI in S814.

Next, in S816 the SFTP server 218 retrieves all columns and displays the selected columns from the whitelisted API 211 via the CPI module 216. In one or more embodiments, the CPI module 216 receives the request from the servlet 308 of the SFTP server 218 via the XML exchange 220, and requests the particular API from the organization platform 202. In one or more embodiments, the API is configured in the CPI module 216 by creating an integration flow where the API to be called is configured based on the XML file name and/or location. The CPI module 216 receives the requested API 211 from the organization platform 202 and maps the data in the completed API to the XML tags 303, in a process opposite from S418, described above, to generate an XML format file. The CPI module 216 then pushes the generated XML format file to the servlet 308 of the SFTP server 218 via the XML exchange 220. The SFTP server 218 then transmits the XML format file to the integration framework module 214 via the XML exchange 220 in S818. As shown in FIG. 3, the SFTP server 218 may pass XML as it is through the servlet 308, which is taken over by XML to JSON parser 310 within the integration framework module 214. The integration framework module converts the XML file format to a JSON format via XML to JSON parser 310, the MAP Reduce (JS) process 304 and the XML binding process 302. In one or more embodiments, and as described above, the XML is received at the XML to JSON parser 310 from the SFTP server 218 by way of the servlet 308. The JSON converted by the XML to JSON parser 310 is utilized and processed via the map reduce process 304. After processing at the map reduce process 304, the JSON is again mapped to XML views othe UI of the integration framework module 214 via the XML binding process 302. The integration framework module 214 then transmits JSON format file to a user interface 1200 of the third-party application 212 for display thereon as shown in FIG. 12.

Figure 11:
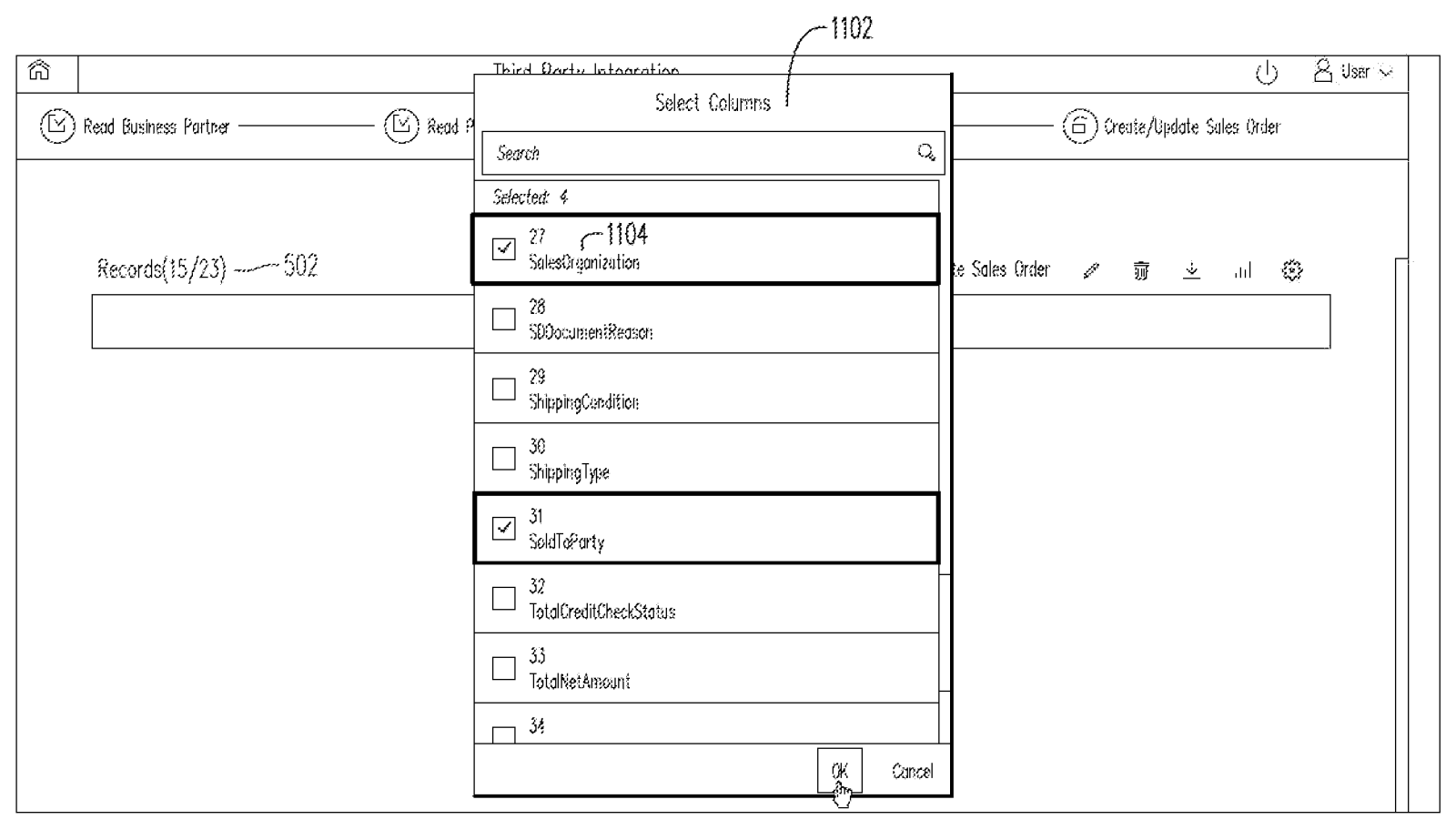

As shown in FIG. 11, the data may be provided in a user-readable format, that is understandable by technical and non-technical users. With respect to a "read" functionality, the complexity involved in consumption of fields (during a "get" functionality) may be reduced in one or more embodiments by the integration framework module—at runtime, dynamically, as described above.

The integration framework module may support XML and JSON formats, and any other suitable formats. In one or more embodiments, the integration framework module may dynamically render the UI based on the XML and JSON format by intelligently identifying the business objects (associated with the respective field) and the number of fields in the XML/JSON format. As described above, the integration framework module may help the user visualize and edit the data in the dynamic UI without requiring a knowledge of XML or JSON formats.

In one or more embodiments, the integration framework module 214 may be used to update data stored in the organization platform 202. The update may come from the third-party application 212, which is then converted to an XML format file and saved in the SFTP server 218, in a similar process as that described above with respect to FIG. 4. It is noted that the process is not exactly the same as that described above with respect to FIG. 4 in that the update or change may be treated differently than a create order as there is already an existing order that is being modified, so that update may be written/associated with that existing order. In one or more embodiments, the integration framework module 214 may determine which fields have changed, and generate a separate XML format file that is marked with a particular naming convention to indicate the update (e.g., field update). The update may be, as two non-exhaustive examples, a user wants to change an existing sales order for 50 items to 100 items; or change the shipment destination from point A to point B. The SFTP server 218 may then save the updated XML format file in an appropriate location. For example, the SFTP server 218 may have a particular location for updated files so that when the CPI module 216 picks the new XML format files from the SFTP server 218, the CPI module 216 knows it's an update operation. The updated XML format file is then transferred to the organization platform 202 in a similar process to that described above with respect to FIG. 4. Again, the difference may be that the CPI is now aware that the operation is an update operation and may then select the appropriate update operation of a particular API. For example, after a user of the third-party application reads the information displayed in FIG. 12, they may want to update the data. To that end, the user may select an entry displayed in FIG. 12 via a radio button 1202 or any other suitable selector. It is noted that the API may or may not return a message about the update to the third-party application. In one or more embodiments, after completion of the update, a read operation is next called to check and show the updated data to the user.

Figure 13:
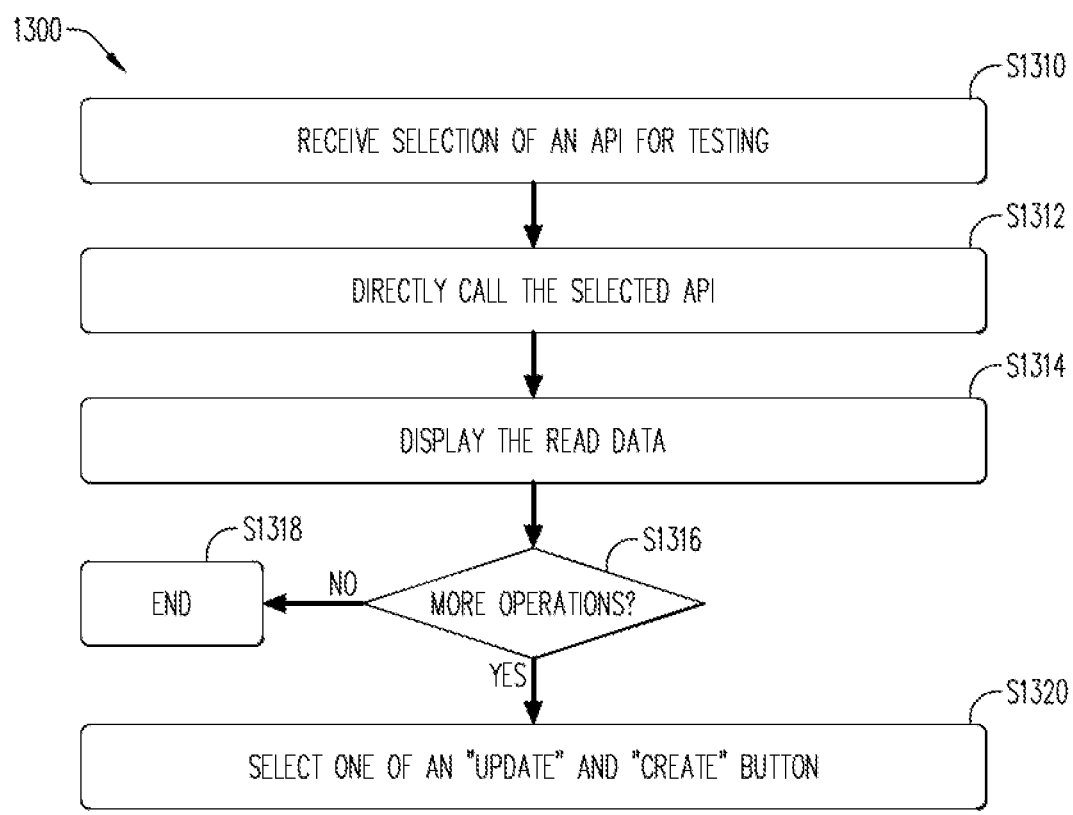
FIG. 13 is a flow diagram of a process according to some embodiments.

Turning to FIG. 13, a process 1300 to test a whitelisted API is provided. In one or more embodiments, the user associated with the third-party application may test any whitelisted API 211 of the organization platform 202 via the integration framework module 214, and the UI provided therefrom. The test process 1300 may occur in a test environment or via a testing tool used during runtime. The user may want to test the API to determine whether it may provide the desired information.

Figure 14A:
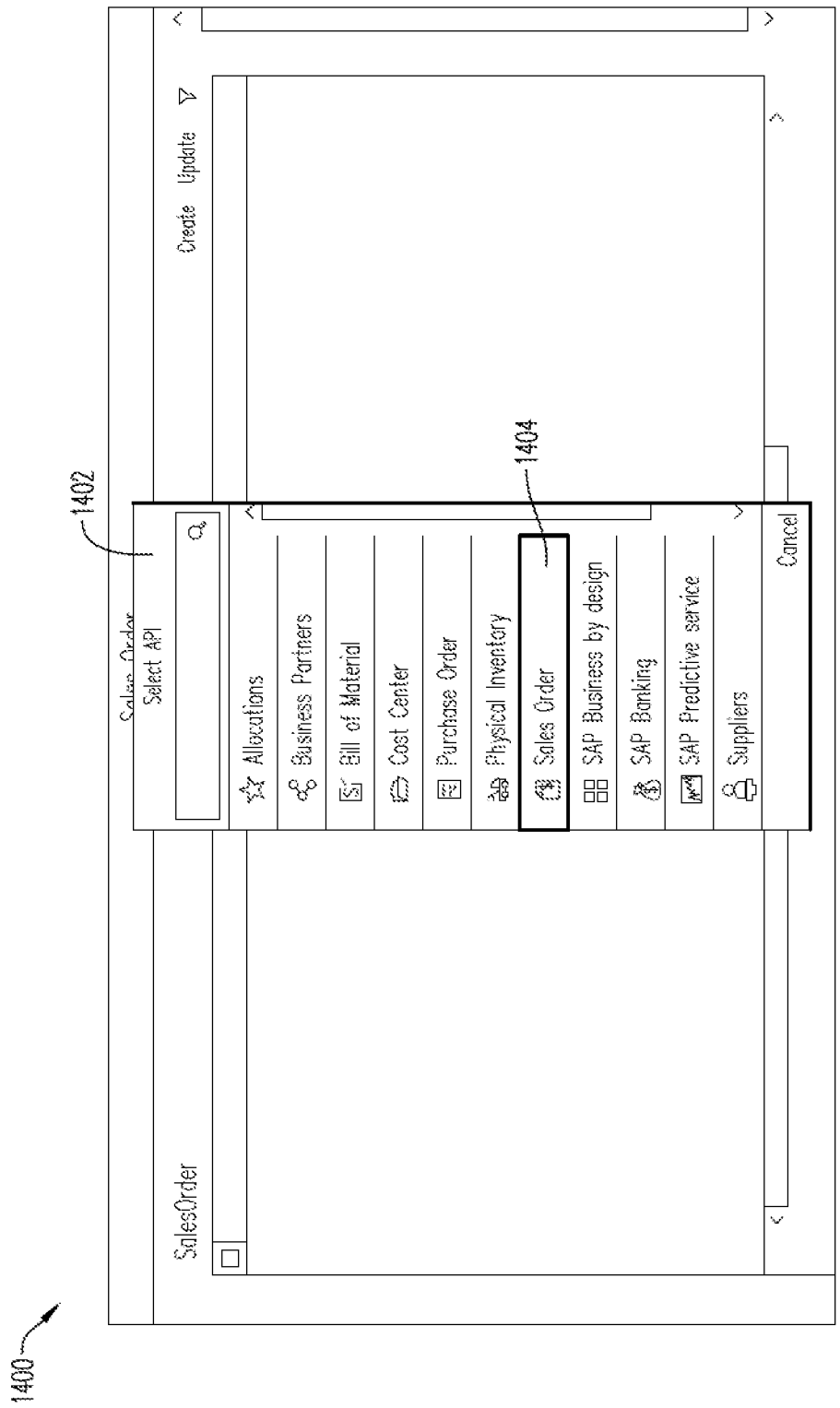
FIG. 14A is an example of a user interface according to some embodiments.

Initially at S1310 the user selects the API for testing, including simulated data for visibility and the selection is received by the integrated framework module 214. The UI 1400 in FIG. 14A provides a list 1402 of selectable APIs 1404 for testing. The user may select the API 1404 via any suitable selector. Then in S1312, the integration framework module 214 directly calls the selected API 1404 from the organization platform 202. Based on the API selected, the data is read from the organization platform 202 via a respective service (e.g., OData or SOAP), and displayed on the UI in S1314, as shown in FIG. 14B. The displayed data may be the output for a test of the read operation. The output of the read operation may allow the user to see the fields and data values expected by the API and the specific format of those data values (e.g., 6 places or 4 places). The user may then determine whether more testing is desired. When no additional testing is desired in S1316, the process ends at S1318. When more testing is desired in S1316, the process proceeds to S1320 and the user may select one of an "update" button 1406 or a "create" button 1408. The user may edit the data by selecting the "update" button 1406 or create a new sales order, for example, by clicking on the "create" button 1408. In one or more embodiments, when the update button 1406 is selected in the test environment, the user is able to edit the selected data (which is already read e.g., Sales Order), and call the update operation of this API.

Figure 15:
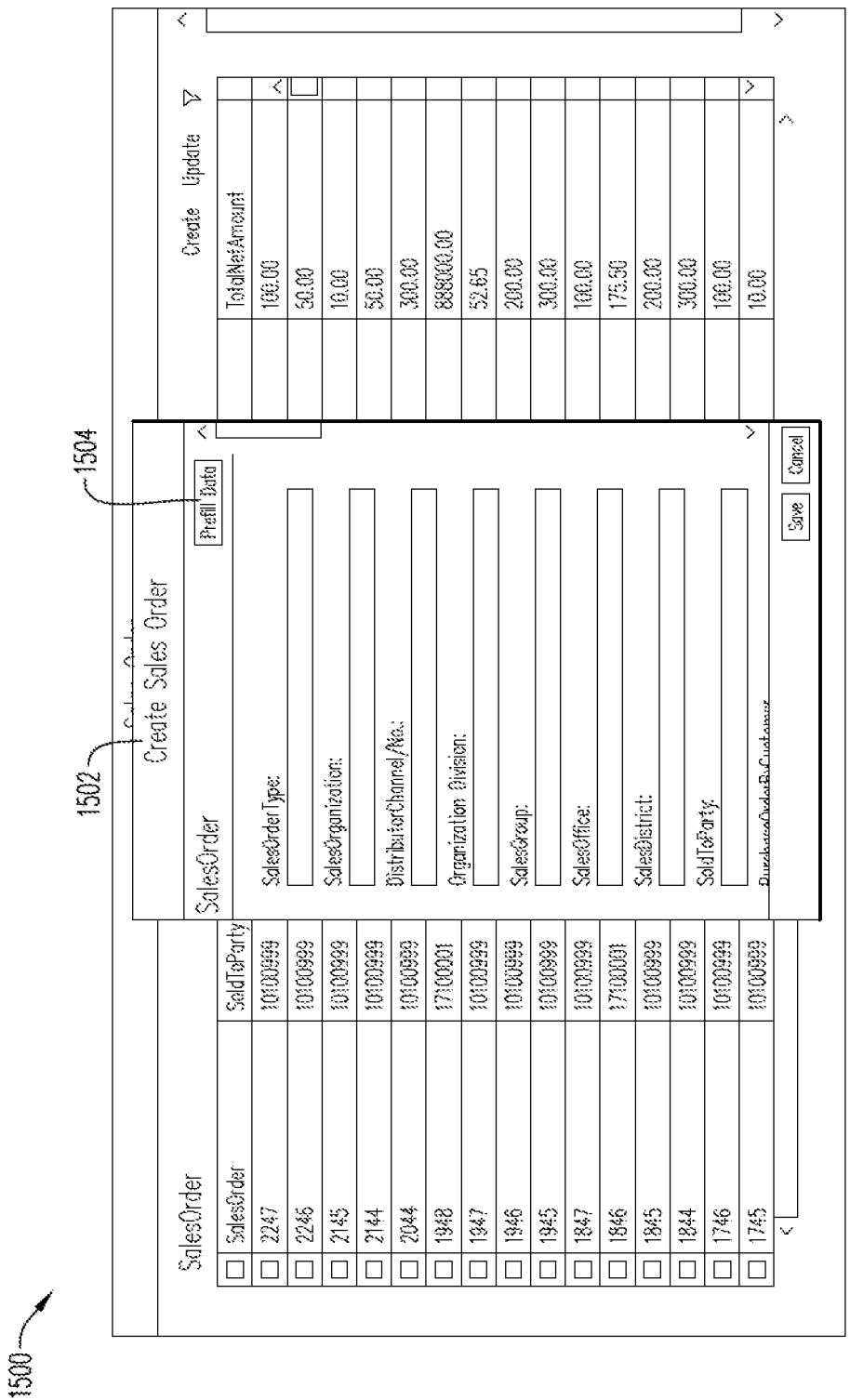
FIG. 15 is an example of a user interface according to some embodiments.

In one or more embodiments, selection of the "create" button 1408 may generate a UI 1500 dynamically with a template 1502 for the respective service, as described above with respect to FIG. 4, and shown in FIG. 15. With the create operation, the user may have an option to pre-fill data, via selection of a pre-fill selector 1504, based on prior created sales orders as per authorizations provided to the user. For example, a sales representative may be able to prefill data only from the sales order created by him, and no one else. It is noted that this pre-fill feature may help a user quickly and easily test the API by avoiding the need for the user to generate a separate JSON/XML Payload, as the fields are filled with existing data, which is mapped to respective fields. It is noted that even if a user is able to create a proper API payload, it may still be difficult to know what data combinations (e.g., specific Division 00 mapped to a specific Sales Organization 1010 in System 1, but may be mapped to another sales organization (e.g., Sales Organization 1710) in System 2) are to be used to complete the API. It is also noted that the user may test the create process by supplying their own data via generation of a separate JSON/XML Payload. Once the data is pre-filled or entered, the user may be able to create the data in the organization platform 202.

It is noted that in the absence of an organization network 202, a user may try and test an API without connecting to the actual organization network 202, and thereby may still do a test run or simulation mode. In this instance, the integration network module may use mock data.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Figure 16:
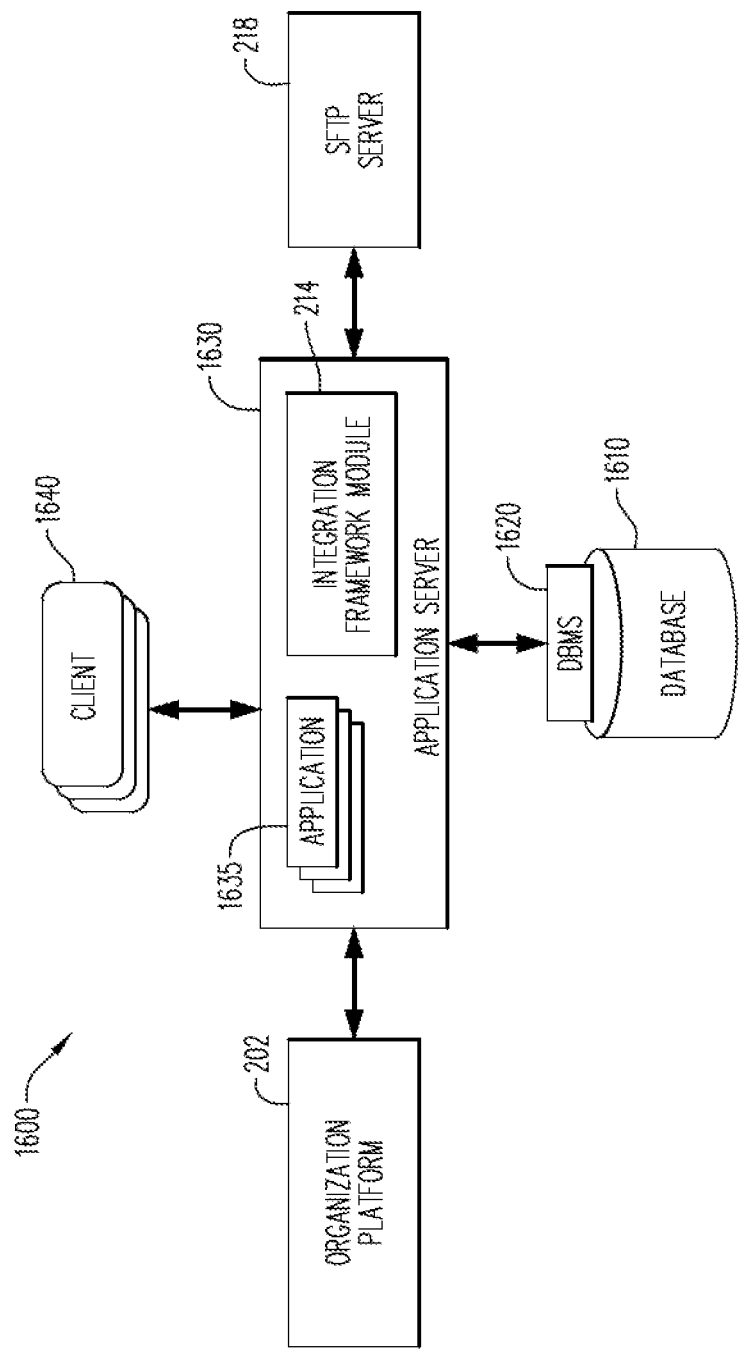
FIG. 16 is block diagram of a system architecture according to some embodiments.

FIG. 16 is a block diagram of system architecture 1600 according to some embodiments. Embodiments are not limited to architecture 1600 or to a three-tier database architecture.

Architecture 1600 includes database 1610, database management system (DBMS) 1620, application server 1630, applications 1635, clients 1640 (e.g., third party application), an integration framework module 214, an organization platform 202 and an SFTP server 218. Applications 1635 may comprise server-side executable program code (e.g., compiled code, scripts, etc.) executing within application server 1630 to receive queries from clients 1640 and provide results to clients 1640. A client 1640 may access the integration framework module 214 executing within application server 1630. Additionally, the client 1640 may access their respective application server storing other applications.

Application server 1630 provides any suitable interfaces through which the client 1640 may communicate with the integration framework module 214 or applications 1635 executing on application server 1630. For example, application server 1630 may include a HyperText Transfer Protocol (HTTP) interface supporting a transient request/response protocol over Transmission Control Protocol/Internet Protocol (TCP/IP), a WebSocket interface supporting non-transient full-duplex communications which implement the Web Socket protocol over a single TCP/IP connection, and/or an Open Data Protocol (OData) interface.

One or more applications 1635 executing on server 1630 may communicate with DBMS 1620 using database management interfaces such as, but not limited to, Open Database Connectivity (ODBC) and Java Database Connectivity (JDBC) interfaces. These types of applications 1635 may use Structured Query Language (SQL) to manage and query data stored in database 1610.

DBMS 1620 serves requests to retrieve and/or modify data of database 1610, and also performs administrative and management functions. Such functions may include snapshot and backup management, indexing, optimization, garbage collection, and/or any other database functions that are or become known. DBMS 1620 may also provide application logic, such as database procedures and/or calculations, according to some embodiments. This application logic may comprise scripts, functional libraries and/or compiled program code.

Application server 1630 may be separated from, or closely integrated with, DBMS 1620. A closely-integrated application server 1630 may enable execution of server applications 1635 completely on the database platform, without the need for an additional application server. For example, according to some embodiments, application server 1630 provides a comprehensive set of embedded services which provide end-to-end support for Web-based applications. The services may include a lightweight web server, configurable support for OData, server-side JavaScript execution and access to SQL and SQLScript.

Application server 1630 may provide application services (e.g., via functional libraries) which applications 1635 may use to manage and query the data of database 1610. The application services can be used to expose the database data model, with its tables, hierarchies, views and database procedures, to clients. In addition to exposing the data model, application server 1630 may host system services such as a search service.

Database 1610 may store data used by at least one of: applications 1635 and the integration framework module 214. For example, database 1610 may store the map 222 accessed by the integration framework module 214 during execution thereof.

Database 1610 may comprise any query-responsive data source or sources that are or become known, including but not limited to a structured-query language (SQL) relational database management system. Database 1610 may comprise a relational database, a multi-dimensional database, an eXtendable Markup Language (XML) document, or any other data storage system storing structured and/or unstructured data. The data of database 1610 may be distributed among several relational databases, dimensional databases, and/or other data sources. Embodiments are not limited to any number or types of data sources.

In some embodiments, the data of database 1610 may comprise one or more of conventional tabular data, row-based data, column-based data, and object-based data. Moreover, the data may be indexed and/or selectively replicated in an index to allow fast searching and retrieval thereof. Database 1610 may support multi-tenancy to separately support multiple unrelated clients by providing multiple logical database systems which are programmatically isolated from one another.

Database 1610 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 1640 may comprise one or more individuals or devices executing program code of a software application for presenting and/or generating user interfaces to allow interaction with application server 1630. Presentation of a user interface as described herein may comprise any degree or type of rendering, depending on the type of user interface code generated by application server 1630.

For example, a client 1640 may execute a Web Browser to request and receive a Web page (e.g., in HTML format) from a website application 1635 of application server 1630 via HTTP, HTTPS, and/or Web Socket, and may render and present the Web page according to known protocols. The client 1640 may also or alternatively present user interfaces by executing a standalone executable file (e.g., an .exe file) or code (e.g., a JAVA applet) within a virtual machine.

Figure 17:
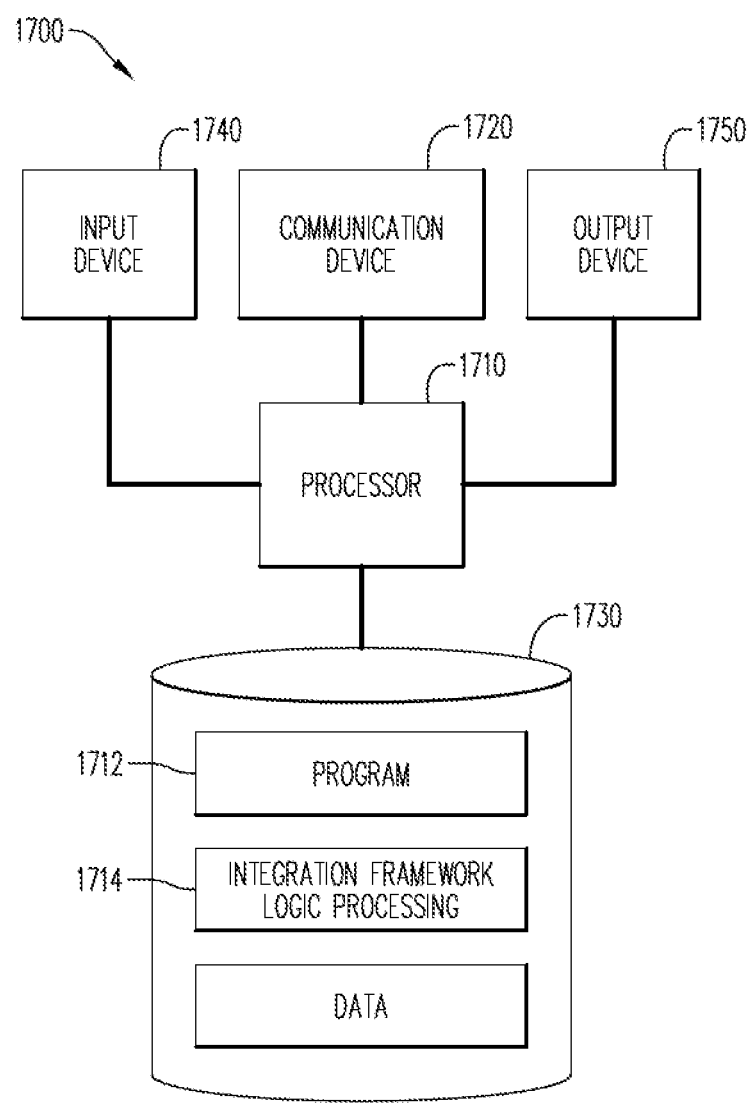
FIG. 17 is a block diagram of a system according to some embodiments.

FIG. 17 is a block diagram of apparatus 1700 according to some embodiments. Apparatus 1700 may comprise a general- or special-purpose computing apparatus and may execute program code to perform any of the functions described herein. Apparatus 1700 may comprise an implementation of one or more elements of system 1600. Apparatus 1700 may include other unshown elements according to some embodiments.

Apparatus 1700 includes an integration framework processor 1710 operatively coupled to communication device 1720, data storage device/memory 1730, one or more input devices 1740, and one or more output devices 1750. Communication device 1720 may facilitate communication with external devices, such as application server 1730. Input device(s) 1740 may comprise, for example, a keyboard, a keypad, a mouse or other pointing device, a microphone, knob or a switch, an infra-red (IR) port, a docking station, and/or a touch screen. Input device(s) 1740 may be used, for example, to manipulate graphical user interfaces and to input information into apparatus 1700. Output device(s) 1750 may comprise, for example, a display (e.g., a display screen) a speaker, and/or a printer.

Data storage device/memory 530 may comprise any device, including combinations of magnetic storage devices (e.g., magnetic tape, hard disk drives and flash memory), optical storage devices, Read Only Memory (ROM) devices, Random Access Memory (RAM) etc.

The storage device 1730 stores a program 1712 and/or integration framework platform logic 1714 for controlling the processor 1710. The processor 1710 performs instructions of the programs 1712, 1714, and thereby operates in accordance with any of the embodiments described herein, including but not limited to processes 400, 800 and 1300.

The programs 1712, 1714 may be stored in a compressed, uncompiled and/or encrypted format. The programs 1712, 1714 may furthermore include other program elements, such as an operating system, a database management system, and/or device drivers used by the processor 1710 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a first platform including an Application Programming Interface (API) provider;
   at least one data source;
   an integration framework module operative to execute:
   an integration process to integrate a third-party application with the first platform, and
   a test process wherein one of a plurality of whitelisted APIs provided by the API provider is executed to analyze the integration;
   a user interface;

a memory storing program instructions; and an integration framework processor, coupled to the memory, and in communication with the integration framework module and operative to execute program instructions to:
  receive input data associated with the at least one data source via the user interface;
  transform the input data to an XML format for the integration process;
  access an API of the plurality of APIs;
  enter XML format data into the API;
  execute the API;
  retrieve data from the API;
  transform the retrieved data into a non-technical format; and
  render the transformed data in a dynamic user interface.

2. The system of claim 1, wherein the integration process includes the execution of at least one of a create, read, update and delete (CRUD) process.

3. The system of claim 2, wherein the first platform is a cloud-based enterprise resource planning (ERP) platform.

4. The system of claim 3, further comprising a cloud platform storing the integration framework module and a cloud platform integration (CPI) module.

5. The system of claim 4, wherein the received input is a request to access the ERP platform for the create process and further comprises program instructions to:
  receive, at the integration framework module, the input data in JSON format;
  transform the input data in JSON format to an XML format;
  receive the transformed input data at the CPI module;
  extract data from the transformed input data;
  map the extracted data to one of the plurality of APIs provided by the API provider; and
  create a record at the ERP platform based on the data mapped to the API.

6. The system of claim 4, wherein the received input data is a request to access the ERP platform for the read process and further comprises program instructions to:
  retrieve data from the record at the ERP platform via the CPI module;
  map the retrieved data from the API to an XML format via the CPI module;
  transform the retrieved data to non-technical format; and
  render the transformed data in a dynamic user interface.

7. The system of claim 5, wherein the transformed input data is transmitted to a server prior to receipt by the CPI module.

8. The system of claim 7, wherein the server is a secure file transfer protocol (SFTP) server.

9. The system of claim 8, wherein the server includes a JAVA servlet layer to execute a push and pull process with at least one of the CPI module and the integration framework module.

10. The system of claim 9, wherein the integration framework module includes at least one parser, a map reduction process and an XML binding process.

11. The system of claim 1 wherein the test process further comprises program instructions to:
  receive a request for data from the at least one data source;
  execute a read API from the stored one or more whitelisted APIs;
  retrieve the requested data in one of a JSON and XML format;
  transform the data into the non-technical format; and
  render the transformed data in a dynamic user interface.

12. The system of claim 11, wherein the third-party application directly calls the read API.

13. The system of claim 11, wherein the request for data is via a template completed by a user.

14. The system of claim 11, wherein the executed API is pre-filled with stored data.

15. A method comprising:
  receiving, at a user interface, selection of one of: an integration process to integrate a third-party application with a first platform, and a test process wherein one of a plurality of Application Programming Interfaces (API)s provided by an API provider is executed in a test environment to analyze the integration;
  receiving input data associated with the at least one data source via the user interface;
  transforming the input data to an XML format for the integration process;
  accessing an API of the plurality of APIs;
  entering XML format data into the API;
  executing the API;
  retrieving data from the API;
  transforming the retrieved data into a non-technical format; and
  rendering the transformed data in a dynamic user interface.

16. The method of claim 15, wherein the integration process includes the execution of at least one of a create, read, update and delete (CRUD) process.

17. The method of claim 16, wherein the received input is a request to access the first platform for the create process and further comprises:
  receiving the input data in JSON format;
  transforming the input data in JSON format to an XML format;
  receiving the transformed input data at a cloud platform integration (CPI) module;
  extracting data from the transformed input data;
  mapping the extracted data to one of the plurality of APIs provided by the API provider; and
  creating a record at the first platform based on the data mapped to the API.

18. The method of claim 16, wherein the test process further comprises:
  receiving a request for data from the at least one data source;
  executing a read API from the stored one or more whitelisted APIs;
  retrieving the requested data in one of a JSON and XML format;
  transforming the data into the non-technical format; and
  rendering the transformed data in a dynamic user interface.

19. A non-transitory computer-readable medium storing program code, the program code executable by a computer system to cause the computer system to:
  receive, at a user interface, selection of one of: an integration process to integrate a third-party application with a first platform, and a test process wherein one of a plurality of Application Programming Interfaces (API)s provided by an API provider is executed in a test environment to analyze the integration;
  receive input data associated with the at least one data source via the user interface;
  transform the input data to an XML format for the integration process;
  access an API of the plurality of APIs;
  enter XML format data into the API;

execute the API;
retrieve data from the API;
transform the retrieved data into a non-technical format; and
render the transformed data in a dynamic user interface.

20. The medium of claim 19 wherein the test process further comprises program code executable by the computer system to cause the computer system to:
receive a request for data from the at least one data source;
execute a read API from the stored one or more whitelisted APIs;
retrieve the requested data in one of a JSON and XML format;
transform the data into the non-technical format; and
render the transformed data in a dynamic user interface.

* * * * *